US009422192B2

(12) United States Patent
Jacob et al.

(10) Patent No.: US 9,422,192 B2
(45) Date of Patent: Aug. 23, 2016

(54) OPTIMISED VERTICAL-SHAFT KILN FOR PRODUCING SULFOALUMINOUS CLINKER

(71) Applicant: VICAT, Paris la Defense (FR)

(72) Inventors: Yvan-Pierre Jacob, Pont de Beauvoisin (FR); Michel Pasquier, Lyons (FR); Dominique Renie, Coublevie (FR); Guy Beauvent, Wierre Effroy (FR)

(73) Assignee: VICAT, Paris la Defense (FR)

( * ) Notice: Subject to any disclaimer, the term of this patent is extended or adjusted under 35 U.S.C. 154(b) by 0 days.

(21) Appl. No.: 14/415,728

(22) PCT Filed: Jul. 12, 2013

(86) PCT No.: PCT/FR2013/051682
§ 371 (c)(1),
(2) Date: Jan. 19, 2015

(87) PCT Pub. No.: WO2014/013171
PCT Pub. Date: Jan. 23, 2014

(65) Prior Publication Data
US 2015/0210593 A1 Jul. 30, 2015

(30) Foreign Application Priority Data
Jul. 17, 2012 (FR) .................................... 12 56891

(51) Int. Cl.
*F27B 1/20* (2006.01)
*C04B 7/44* (2006.01)
(Continued)

(52) U.S. Cl.
CPC .............. *C04B 7/4469* (2013.01); *C04B 7/32* (2013.01); *C04B 7/323* (2013.01); *C04B 7/434* (2013.01); *F27B 1/005* (2013.01); *F27B 1/16* (2013.01); *F27B 1/21* (2013.01)

(58) Field of Classification Search
CPC ............ F27B 1/005; F27B 1/16; F27B 1/21; C04B 2/12
USPC ........................................ 432/95, 97, 98, 99
See application file for complete search history.

(56) References Cited

U.S. PATENT DOCUMENTS

| 2,470,543 | A |   | 5/1949 | Azbe |
|---|---|---|---|---|
| 4,028,049 | A | * | 6/1977 | Naudy ................... F27B 7/2033 432/106 |

(Continued)

FOREIGN PATENT DOCUMENTS

| CN | 1094383 A | 11/1994 |
|---|---|---|
| DE | 2117755 A1 | 2/1972 |

(Continued)

OTHER PUBLICATIONS

International Search Report issued Oct. 25, 2013 re: Application No. PCT/FR2013/051682; citing: De 41 16 300 A1, DE 21 17 755 A1, U.S. Pat. No. 2,470,543 A, GB 602 385 A and FR 2 928 643 A1.

*Primary Examiner* — Gregory A Wilson
(74) *Attorney, Agent, or Firm* — Cantor Colburn LLP

(57) ABSTRACT

The invention relates to a vertical-shaft kiln (2) for manufacturing a clinker, including:
a tubular enclosure (4) comprising from top to bottom:
a feeder section (14);
a decarbonatation section (16) exhibiting a slanted lower surface (16a);
a clinkering section (18) exhibiting a slanted lower surface (18a);
a first collection section (20) extending substantially vertically;
first extraction means (42) arranged for extracting the clinker from the first collection section (20);
means arranged for generating a first gas exhibiting a temperature ranging between 950° C. and 1250° C., and for supplying the first gas in the decarbonatation section (16);
means arranged for generating a second oxidizing gas exhibiting a temperature ranging between 1250° C. and 1450° C., and for supplying the second oxidizing gas in the clinkering section (18); and
first suction means for suctioning the first and second gas from the feeder section (14).

16 Claims, 8 Drawing Sheets

(51) Int. Cl.
*F27B 1/00* (2006.01)
*F27B 1/21* (2006.01)
*C04B 7/32* (2006.01)
*C04B 7/43* (2006.01)
*F27B 1/16* (2006.01)

(56) References Cited

U.S. PATENT DOCUMENTS 4,367,095 A * 1/1983 Namy .................... F27B 1/005
                                                  106/743

4,504,319 A * 3/1985 Wolter .................... C04B 7/147
                                                  106/767
4,861,458 A * 8/1989 Martin ...................... B01J 8/26
                                                  208/113

FOREIGN PATENT DOCUMENTS

| DE | 4116300 A1 | 11/1992 |
| FR | 2928643 A1 | 9/2009 |
| GB | 602385 A | 5/1948 |

* cited by examiner

OPTIMISED VERTICAL-SHAFT KILN FOR PRODUCING SULFOALUMINOUS CLINKER

TECHNICAL FIELD

The present invention relates to a vertical-shaft kiln for manufacturing a clinker, in particular sulfo-aluminous, sulfo-aluminous belite, alinite, fluoro-alinite, chloro-aluminous, or more generally any clinker forming into a solid solution without generating a liquid phase, as well as an installation equipped with this kiln.

BACKGROUND

The term "vertical-shaft kiln" designates any kiln of which the enclosure extends in a substantially vertical direction.

An installation for manufacturing a clinker usually has two objectives: to mass manufacture a clinker and manufacture a regular, that is to say a homogenous clinker.

It is known from the state of the art an installation for manufacturing a sulfo-aluminous clinker equipped with a cyclone preheater, a precalciner and a rotary kiln. Such an installation allows mass production but not the production of a regular clinker.

It is known, by document FR2928643, an installation for the manufacture of a sulfo-aluminous clinker equipped with a vertical-shaft kiln for decarbonatation and a continuous clinkering kiln.

The vertical-shaft kiln comprises an enclosure inside which a raw mix is poured containing in particular calcium, aluminum, silica, iron and sulfur in combined mineral form such as for example oxides, hydroxides, carbonates, chlorides and sulfates. The vertical-shaft kiln comprises supply furnace flues of a gas at a temperature ranging between 900° C. and 1150° C., in such a manner as to dehydrate and decarbonate the raw mix.

The continuous kiln comprises a furnace, inside which a plurality of moveable carriages circulate. One layer of raw mix from the vertical-shaft kiln is extended over each of the carriages. The continuous kiln comprises a plurality of burners distributed along the furnace. These burners take the raw mix to a temperature in the range of 1250° C. to 1450° C., in such a manner as to clinker it.

Such an installation allows to finely monitor the profile of temperatures during the clinkering by adjusting the power of the burners and the speed of displacement of the carriages. Thus, the manufactured clinker exhibits a very good regularity.

However, the thickness of the layers of raw mix disposed on the carriages of the continuous kiln is low. Moreover, the production capacity of such an installation is limited.

It is also known, by document CN1094383, an installation for the manufacture of a sulfo-aluminous clinker equipped with a vertical-shaft kiln. This vertical-shaft kiln comprises a furnace inside which is poured a raw mix containing calcium, aluminum, silica, iron, and sulfur mixed with a solid combustible such as coal.

A drawback of such an installation is that the raw mix exhibits an irregular granulometry. In addition, when this raw mix is poured into the furnace, the air circulates in unequal quantity between the pellets forming the raw mix, and the combustible is mixed in a heterogeneous manner. Thereafter, the combustion of the combustible is unequal, and the achieved clinker is irregular.

Furthermore, the proximity of the combustible and the raw mix pellets causes the formation of reducing zones in the furnace, that is to say zones without oxygen. These reducing zones lead to the loss of sulfur and a degradation of the chemical composition sought. Particularly, a $C_{12}A_7$ phase, called mayenite, appears. This phase highly accelerates the hydraulic setting up of a cement, and is consequently detrimental.

Finally, a vertical-shaft kiln, of the type described in document CN1094383, is generally provided with an ambient air inlet mouth in lower portion of the furnace.

Such a mouth allows the intake of combustion air of the solid combustible mixed with the raw mix.

Such a mouth further allows the cooling of the clinker before extraction from the furnace. On the other hand, the sticking risks, and after the blinding of the furnace, by the clinker may be limited.

A drawback of such a type of vertical-shaft kiln is that the cooling is undergone rather than mastered. However, it is known that the cooling speed of the clinker determines the setting up time and the demand for water of the cement achieved based on this clinker.

As a result, a cement achieved from a clinker manufactured in this type of kiln exhibits a badly mastered setting up time and demand for water.

BRIEF SUMMARY

The purpose of the invention is to remedy to all or part of the aforementioned drawbacks.

The invention aims in particular to provide a vertical-shaft kiln for manufacturing a regular sulfo-aluminous clinker and as part of a mass production.

The invention relates to a vertical-shaft kiln for manufacturing a clinker, characterized in that it comprises:
 a tubular enclosure comprising from top to bottom:
  a feeder section extending substantially vertically, designed for receiving a raw mix;
  a decarbonatation section exhibiting a lower surface slanted with respect to the vertical;
  a clinkering section exhibiting a lower surface slanted with respect to the vertical;
 a first collection section extending substantially vertically;
 first extraction means arranged for extracting the clinker from the first collection section, suitable for modulating the extraction output of the clinker;
 first generation means arranged for generating a first gas exhibiting a temperature ranging between 950° C. and 1250° C.;
 first supply means arranged to supply the first gas in the decarbonatation section;
 second generation means arranged for generating a second oxidizing gas exhibiting a temperature ranging between 1250° C. and 1450° C.;
 second supply means arranged to supply the second oxidizing gas in the clinkering section; and
 first suction means for suctioning the first and second gas from the feeder section.

According to a first embodiment, the lower surface of the clinkering section is oriented transversally to the lower surface of the carbonatation section.

According to a second embodiment, the lower faces of the decarbonatation and clinkering sections are slanted in the same direction. Preferably, they have the same inclination. They may be shifted with respect to one another, a downward setback being provided between the lower end of the lower surface of the decarbonatation section and the upper end of the lower surface of the clinkering section.

The clinker manufactured by the kiln according to the invention may be a sulfo-aluminous clinker, a sulfo-aluminous belite, alinite, fluoro alinite, chloro-aluminous, or more generally any clinker forming into a solid solution without generating a liquid phase.

Preferably, the raw mix contains calcium, aluminum, silica, iron, sulfur, in combined mineral form such as oxides, hydroxides, carbonates, chlorides or sulfates.

The use of the second oxidizing gas, that is to say with excess air, is particularly advantageous in that it prevents the formation of reducing zones in the clinkering section, and after prevents the formation of the prejudicial $C_{12}A_7$ phase.

The use of decarbonatation and clinkering sections exhibiting lower slanted surfaces allows distributing the load on the lower surfaces and not on the pellets forming the raw mix anymore, in such a manner as to reduce the sticking and blinding risk of the decarbonatation and clinkering sections.

The lower surfaces of the decarbonatation and clinkering sections oriented transversally allow forming a ramp through which the first and/or the second gas ascends in counter current. Thus, the thermal exchanges between the raw mix and the first and second gas are maximized.

The dissociation of the first and second supply means allows to finely monitor the temperature profile in the decarbonatation and clinkering section.

The first extraction means allows to finely adjust the residence time of the raw mix in the clinkering section.

Thus, the regularity of a clinker manufactured with an installation equipped with a vertical-shaft kiln according to the invention is:
  better than that of a clinker manufactured with the installation described in document CN1094383; and
  substantially identical to that of a clinker manufactured with the installation described in document FR2928643.

An installation equipped with the vertical-shaft kiln according to the invention exhibits a production capacity higher than that of the installation described in document FR2928643.

Finally, the vertical-shaft kiln according to the invention no longer requires that the raw mix be mixed with a solid combustible, thus allowing to be rid of the drawbacks linked to the use of a solid combustible.

The vertical-shaft kiln according to the invention may comprise one or several of the following features.

According to a feature, the decarbonatation section and the clinkering section exhibit rectangular transversal sections;
  the decarbonatation section and the clinkering section exhibit upper surfaces slanted with respect to the vertical;
  the lower edge of the lower surface of the decarbonatation section extends substantially vertically in line with the lower edge of the upper surface of this decarbonatation section; and
  the lower edge of the lower surface of the clinkering section extends substantially vertically in line with the lower edge of the upper surface of this clinkering section.

Preferably, the lower surfaces of the decarbonatation and clinkering sections form an angle ranging between 80° and 140°.

Preferably, the lower surfaces of the decarbonatation and clinkering sections form an angle which is lower than 45° with respect to the vertical.

Advantageously, the first generation means are distinct from the second generation means.

Advantageously, the first supply means are arranged to supply the first gas in the decarbonatation section, from the downstream end of this decarbonatation section; and
  the second supply means are arranged to supply the second gas in the clinkering section, from the downstream end of this clinkering section.

Thus, the first and second gases bring up the raw mix in counter current over the entire length of the decarbonatation and clinkering sections, in such a manner that the thermal exchanges are maximized.

In this description, the terms "upstream" and "downstream" are used with reference to the flow direction of the raw mix in the enclosure.

Advantageously still, the decarbonatation section exhibits a plurality of longitudinal walls dividing this section into a plurality of ducts; and/or
  the clinkering section exhibits a plurality of longitudinal walls dividing this section into a plurality of ducts.

Such walls allow homogenizing the speed profile of the raw mix over the entire width of the decarbonatation and clinkering sections, and then homogenizing the residence time of the raw mix in each of the decarbonatation and clinkering sections.

Furthermore, such walls allow distributing the load on the walls and no longer on the pellets forming the raw mix, in such a manner as to reduce the risk of sticking and blinding the decarbonatation and clinkering sections.

According to a feature, the first supply means comprise a plurality of first furnace flues each opening at the downstream end of a duct of the decarbonatation section; and
  the second supply means comprise a plurality of second furnace flues each opening at the downstream end of a duct of the clinkering section.

Such an arrangement allows ensuring that each of the ducts of the decarbonatation section and of the clinkering section receives a same output of first or second gas. Thus, the thermal treatment of the raw mix is identical in each of the ducts.

Advantageously, the kiln comprises:
  a second collection section disposed between the decarbonatation section and the clinkering section;
  second extraction means arranged for extracting the decarbonated raw mix contained in the second collection section and supply it to the clinkering section, these second extraction means being suitable for modulating the extraction output of the decarbonated raw mix.

The second extraction means allow to finely adjust the residence time of the raw mix in the decarbonatation section.

Preferably, the first and/or second extraction means comprise:
  an upper stationary part and a lower moveable part delimiting a connecting section, this section being provided with an inlet mouth and an outlet mouth shifted vertically and horizontally;
  the lower moveable part being able to be displaced in a determined direction alternatively between an advanced position and a receded position, to allow the flow, respectively, of the clinker and the decarbonated raw mix in the connecting section; and
  means for displacing and guiding the moveable part relatively to the stationary part.

The first and/or second extraction means thus comprise extraction means of reciprocating feeder type.

The residence time of the raw mix in the decarbonatation section and/or in the clinkering section may be adjusted by playing on the frequency and the travel of the moveable part.

Advantageously, the upper stationary part of the first extraction means exhibits an ambient air supply pipe equipped with means for regulating the supplied ambient air output.

Such a pipe allows regulating the air output in the second extraction means and then mastering the cooling of the clinker.

The cooling of the clinker allows limiting the risks of sticking and blinding of the first extraction means.

According to a feature, the kiln comprises second suction means arranged between the decarbonatation section and the clinkering section to suction all or part of the second gas from the clinkering section.

In these conditions, the second gas ascends into the clinkering section and is then discharged from the enclosure.

Only a tiny part of the second gas ascends into the decarbonatation section. Monitoring the thermal profile in the decarbonation section is thus mastered better.

According to another feature, the kiln comprises means for adjusting the position of the upper slanted surface of the clinkering section with respect to the lower slanted surface of the clinkering section, in such a manner as to make the residence time of the clinker in the clinkering section vary.

This flexibility allows making the clinkering section cross-section vary and hence acts on the clinkering time by keeping a constant pellet height.

According to another feature, the kiln comprises:
first means for measuring the temperature of the first and second supplied gases;
second means for measuring the pressure of the first and second supplied gases; and/or
third means for measuring the temperature of the raw mix inside the decarbonatation and clinkering sections; and
a controlling unit arranged for controlling the first supply means and the second supply means according to the measurements achieved by the first, second and/or third measuring means.

The controlling unit may thus implement a monitoring rule in such a manner that the temperatures and pressures in the decarbonatation and clinkering sections be regulated around setpoint values.

According to another feature, the enclosure comprises an outer metallic envelope, and an inner envelope achieved by stacking at least:
a first coating in a thermally insulating material mounted on the outer metallic envelope; and
a second coating in a refractory material mounted on the first coating.

The first coating protects the outer metallic envelope from thermal dilation. The second coating protects the first coating from abrasion.

The combined presence of a first coating in a thermally insulating material and a second coating in a refractory material allows protecting the outer metallic envelope of the enclosure from weakening which could normally be caused if the latter reached the temperature of the raw mix, of which the temperature gradually increases as the raw mix flows into the enclosure.

The invention also relates to an installation for manufacturing a clinker comprising:
a kiln such as exhibited here-before; and
a cooler, preferably a reciprocating grate cooler, arranged to cool the clinker extracted by the first extraction means.

The cooler allows to perfectly master the cooling of the clinker and no longer undergoes it. Thus, a cement achieved from a clinker manufactured by such an installation exhibits mastered setting up time and demand for water.

The invention finally relates to a method for manufacturing a clinker comprising the following steps:
providing a kiln according to the invention;
supplying a first gas exhibiting a temperature ranging between 950° C. and 1250° C. in the decarbonatation section; and
supplying a second oxidizing gas exhibiting a temperature ranging between 1250° C. and 1450° C. in the clinkering section.

BRIEF DESCRIPTION OF THE DRAWINGS

The invention will be better understood upon reading the following description with reference to the accompanying schematic drawing representing, by way of non limiting example, four vertical-shaft kilns according to the invention.

DETAILED DESCRIPTION

Figure 1:
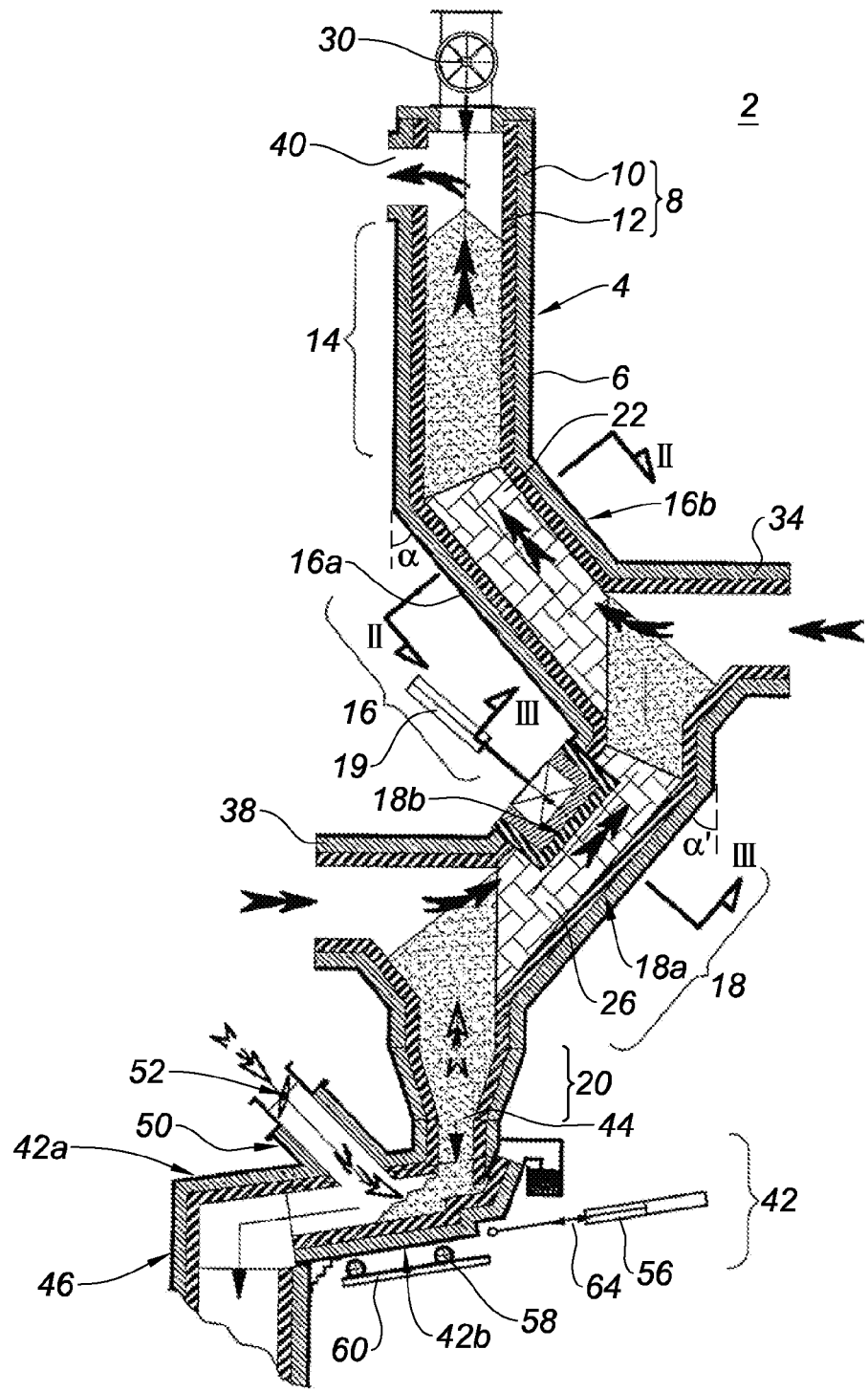
FIG. 1 is a longitudinal sectional view of a first vertical-shaft kiln.

FIG. 1 represents a vertical-shaft kiln 2 for manufacturing a sulfo-aluminous clinker. This kiln 2 comprises a tubular enclosure 4 extending substantially vertically.

The enclosure 4 comprises an outer metallic envelope 6, and an inner envelope 8 achieved by stacking:
of a coating 10 in a thermally insulating material mounted on the outer envelope 6; and
of a coating 12 in a refractory material mounted on the coating 10.

The coating 10 in a thermally insulating material is characterized by a thermal conductivity at 1000° C. ranging between 0.05 and 0.4 W/m·K, a density ranging between 50 and 500 kg/m3, and a compression resistance ranging between 0.1 and 0.5 MPa.

The coating 12 in a refractory material is characterized by a thermal conductivity at 1000° C. ranging between 0.2 and 2.5 W/m·K, a density ranging between 1000 and 3000 kg/m3, and a compression resistance ranging between 20 and 120 MPa. For example, the refractory material may of silicon carbide.

The enclosure 4 comprises from top to bottom a feeder section 14, a decarbonatation section 16, a clinkering section 18, and a collection section 20.

The feeder 14 and collection 20 sections extend substantially vertically. The decarbonatation 16 and clinkering 18 sections are slanted with respect to the vertical.

More specifically, the decarbonatation 16 and clinkering 18 sections exhibit rectangular transversal cross-sections.

The decarbonatation 16 and clinkering 18 sections exhibit lower, respectively, 16a and 18a and upper, respectively, 16b and 18b parallel surfaces.

The lower 16a and upper 16b surfaces of the decarbonatation section 16 form an angle α in the range of 40° with respect to the vertical. Likewise, the lower and upper surfaces of the clinkering section form an angle α' in the range of 40° with respect to the vertical.

The lower surfaces 16a and 18a of the decarbonatation 16 and clinkering sections form an angle ranging between 80° and 140°.

The decarbonatation 16 and clinkering 18 sections are arranged in such a manner that:
the lower edge of the lower surface 16a of the decarbonatation section 16 extends substantially vertically in line with the lower edge of the upper surface 16*b* of this decarbonatation section 16, and the lower edge of the lower surface 18*a* of the clinkering section 18 extends substantially vertically in line with the lower edge of the upper surface 18*b* of this clinkering section 18.

The position of the upper surface 18*b* of the clinkering section is adjustable with respect to the lower surface 18*a* thereof. This adjusting, may be carried out for example by means of jacks 19 which displace all or part of the upper surface 18*b* with respect to the lower surface 18*a*, which remains stationary.

Figure 2:
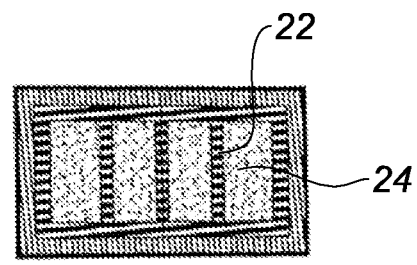
FIG. 2 is a cross-sectional view according to line II-II of FIG. 1.
Figure 3A:
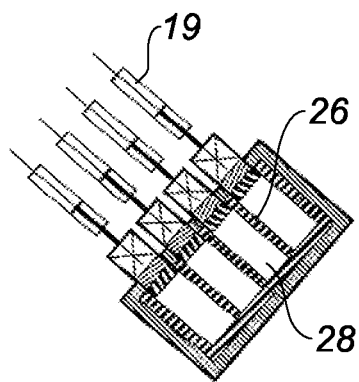
FIG. 3A is a cross-sectional view according to line III-III of FIG. 1, when the upper surface of the clinkering section is advanced with respect to the lower surface of this same clinkering section.
Figure 3B:
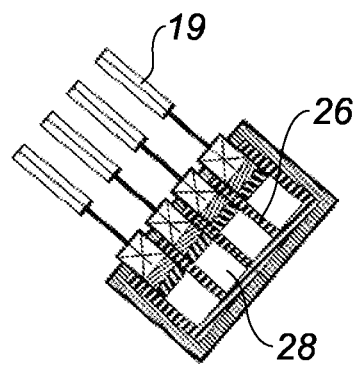
FIG. 3B is a cross-sectional view according to line III-III of FIG. 1, when the upper surface of the clinkering section is receded with respect to the lower surface of this same clinkering section.

The decarbonatation section 16 exhibits three longitudinal walls 22 delimiting four ducts 24 (represented on FIG. 2). Likewise, the clinkering section 18 exhibits three longitudinal walls 26 delimiting four ducts 28 (represented on FIGS. 3A and 3B). The walls 22 and 26 are in refractory material.

The kiln 2 comprises a lock 30 for introducing pellets of raw mix in the feeder section 14. In the example, the lock 30 is rotatable. The lock 30 is permeable in such a manner as to limit the ambient air output liable to penetrate into the enclosure 4.

The kiln 2 comprises means 32 (represented on FIG. 5) for generating a first gas exhibiting a temperature ranging between 950° C. and 1250° C. The first gas may be an oxidizing or reducing gas.

A first reducing gas would not be detrimental in as far as this first gas ascends from the decarbonatation section 16 in the direction of the feeder section 14 located directly above without crossing the clinkering section 18 located directly below. The means 32 for generating the first gas are described below.

Figure 4:
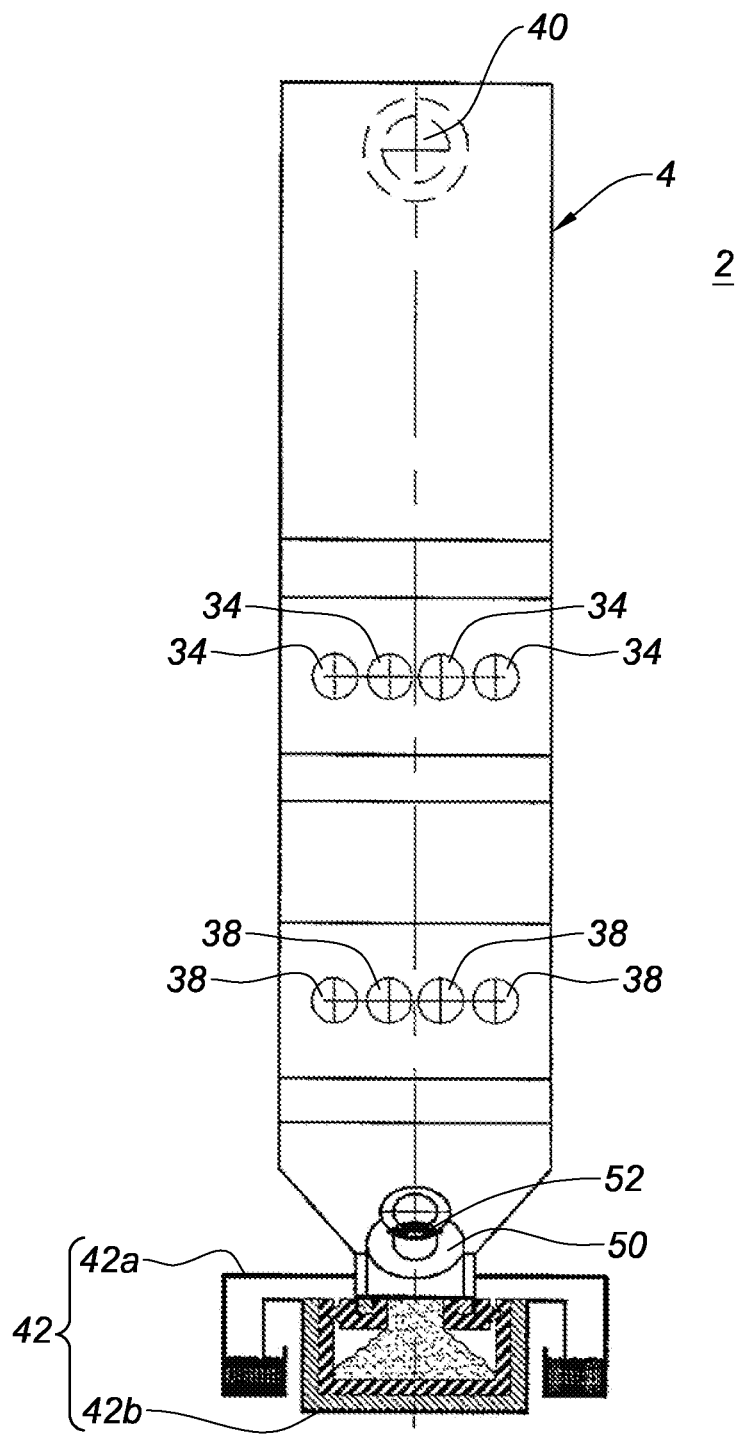
FIG. 4 is a side view of it.

The kiln 2 comprises means for supplying the first gas in the decarbonatation section. These means for supplying the first gas comprise four furnace flues 34 (represented on FIG. 4) each opening at the downstream end of a duct 24 of the decarbonatation section 16.

The kiln 2 comprises means 36 (represented on FIG. 5) for generating a second gas exhibiting a temperature ranging between 1250° C. and 1450° C. This second gas is oxidizing such as to prevent the formation of reducing zones in the clinkering section 18 and then prevent the formation of the $C_{12}A_7$ phase detrimental during the clinkering. The means 36 for generating the second gas are described below.

The kiln 2 comprises means for supplying the second gas in the clinkering section 18. These supply means comprise four furnace flues 38 each opening at the downstream end of a duct 28 of the clinkering section 18.

The kiln 2 comprises means for suctioning the first and second gases from the feeder section. These suction means comprise a furnace flue 40 opening into the feeder section and a suction ventilator 41 (represented on FIG. 5).

The kiln 2 comprises extraction means arranged for extracting the clinker contained in the collection section. The extraction means are here achieved in the form of a drawer extractor 42.

The drawer extractor 42 comprises an upper stationary part 42*a* and a lower moveable part 42*b* delimiting a connecting section. This section is provided with an inlet mouth 44 connected to the collection section 20 and an outlet mouth 46 connected to a cooler 48 (represented on FIG. 5). The inlet 44 and outlet 46 mouths are shifted vertically and horizontally.

The upper stationary part 42*a* of the drawer extractor 42 is equipped with an ambient air supply pipe 50 and means for regulating the output of ambient air. These regulating means are here achieved in the form of a valve 52.

The lower moveable part 42*b* is displaceable in a determined direction 54 alternatively between an advanced position and a receded position, to allow the flow of the clinker contained in the collection section 20.

The drawer extractor 42 comprises means for displacing and guiding the moveable part 42*b* relatively to the stationary part 42*a*. The displacement means comprise for example a pneumatic jack 56.

The guiding means comprise wheels 58 fixed under the moveable part 42*b* and meshed in rails 60.

The clinker extraction output may be modulated by playing on the frequency and the travel of the moveable part. An increase in the frequency increases the extraction output. A decrease in the frequency decreases the extraction output. An elongation of the travel increases the extraction output. A shortening of the travel reduces the extraction output.

Finally the kiln 2 comprises:
temperature sensors of the first and second gases supplied (not represented);
sensors for measuring the pressure of the first and second gas supplied (not represented);
sensors for measuring the temperature of the raw mix inside the decarbonatation 16 and clinkering 18 sections (not represented), such as pyrometers; and
a controlling unit (not represented) arranged for controlling the means 32 and 36 for generating first gases and second gases according to the measurements achieved by the measuring sensors.

An method of operating the kiln 2 is now described.

Pellets of raw mix containing calcium, aluminum, silica, iron, sulfur, preferably in combined mineral form such as oxides, hydroxides, carbonates, chlorides or sulfates, are poured into the feeder section 14 by means of the lock 30. The pellets of raw mix flow by gravity into the enclosure 4.

As the pellets of raw mix flow into the feeder section 14, the first and second gases ascend into the enclosure 4 as a result of the suction ventilator 41, and take the pellets of raw mix to a temperature of the order of 600° C. The pellets of raw mix are dried, pre-heated, and undergo certain chemical transformations, such as the dehydroxylation of the bauxite.

The length and cross-section of the feeder section 14 are sized in order to ensure a minimum residence time of the pellets of raw mix in the feeder section 14. In fact, it is necessary that these chemical transformations be not too rapid in order to prevent the alteration of the pellets of raw mix.

The pellets of raw mix then flow in the decarbonatation section 16. The lower slanted surface 16*a* allows the formation, at its downstream end, of a ramp from which the first and second gases ascend. The pellets of raw mix are taken to a temperature ranging between 850° C. and 950° C., and are decarbonated.

The length and cross-section of the decarbonatation section 16 are sized in such a manner that the residence time of the pellets of raw mix in the decarbonatation section 16 is equal to a determined time.

The pellets of raw mix hence flow in the clinkering section 18. The lower slanted surface 18*a* allows, at the downstream end thereof, the formation of a ramp from which only the second gas ascends. The pellets of raw mix are taken to a temperature ranging between 1280° C. and 1450° C., and are clinkered.

The length and cross-section of the clinkering section are sized in such a manner that the residence time of the pellets of raw mix in the clinkering section 18 is equal to a determined time.

Finally, the clinkered pellets of raw mix are collected in the collection section 20.

The drawer extractor 42 extracts, at a determined output, the clinker pellets from the collection section 20 as a result of the alternative displacement of the moveable part 42*a* relatively to the stationary part 42*b*, and supplies these clinker pellets in the cooler 48 connected to the outlet mouth 46 of the drawer extractor 42.

Figure 5:
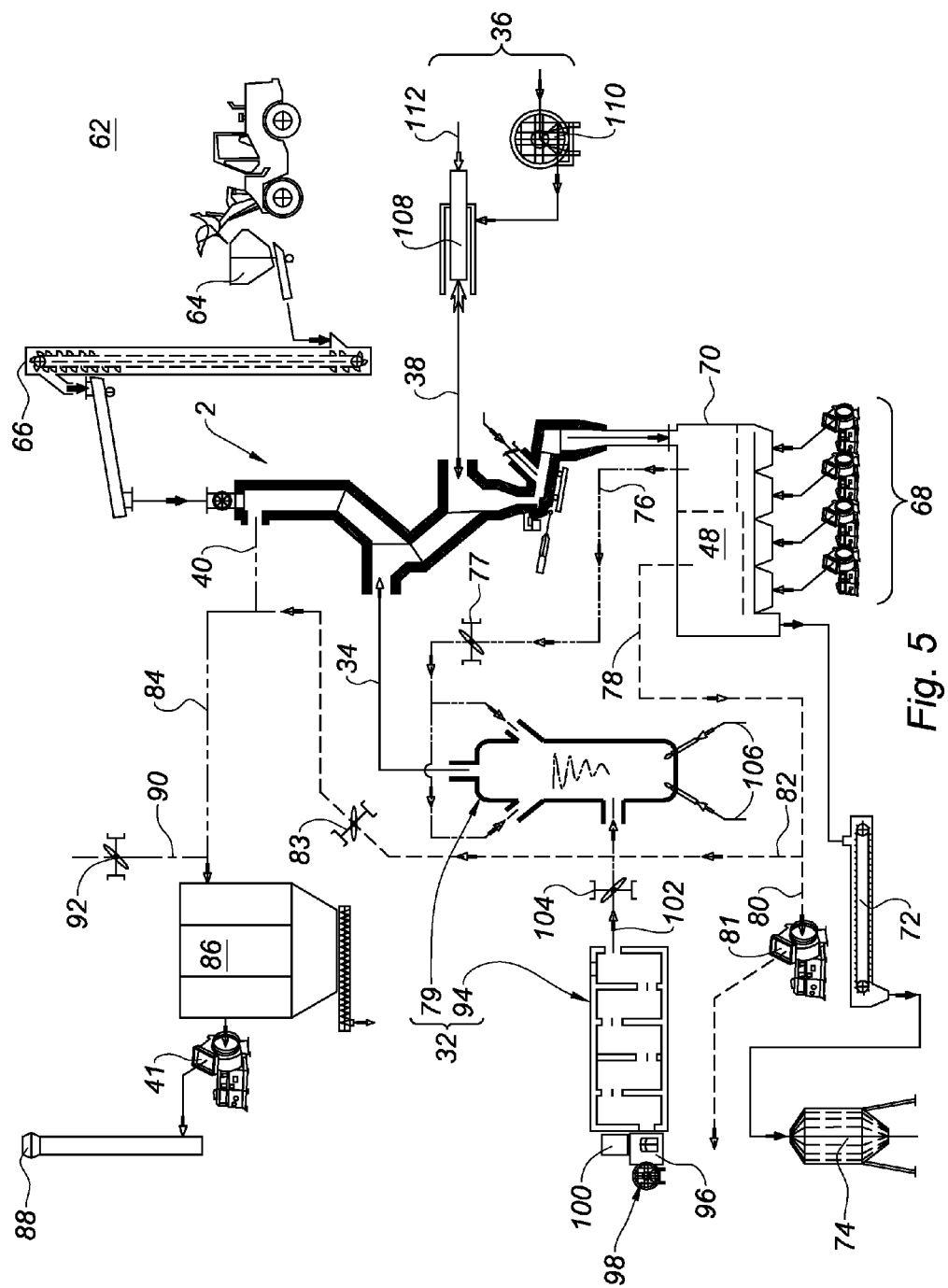
FIG. 5 is a schematic representation of an installation equipped with the vertical-shaft kiln of FIG. 1.

An installation 62 equipped with the kiln and its operating method are now described with reference to FIG. 5.

Initially, the raw mix is crushed, homogenized and pelletized, for example by a roller press 64.

A handling device, for example a bucket elevator 66, collects the pellets of raw mix and feeds the lock 30 of the kiln 2.

The kiln 2 hence chemically transforms the pellets of raw mix into clinker pellets (such as described here-before). The drawer extractor 42 supplies the clinker pellets inside the cooler 48.

The cooler 48 is here a reciprocating grate cooler, rather than a rotary cooler or a balloon cooler. The cooler 48 comprises a ventilator battery 68 blowing air into a chamber 70 through which the clinker is conveyed.

The cooled clinker is gathered downstream of the cooler 48 by a conveyor 72, for example a chain conveyor, suitable for transporting the clinker at a temperature in the range of 150° C. to 250° C. The conveyor 72 transports the clinker to a silo 74, where the latter is stored with a view to be crushed.

The air blown by the ventilators 68, after having been heated in the contact of the clinker, is extracted from the chamber 70 by a sheath 76 opening at an upstream end of the cooler 48 and by a sheath 78 opening at a downstream end of the cooler 48.

The hottest air, extracted by the sheath 76, is lead inside a mixing pot 79 of which the function will become apparent afterwards. The sheath 76 is equipped with a valve 77.

The least hot air, extracted by the sheath 78, is lead to sheaths 80 and 82. The sheath 80 feeds a system for drying the raw mix prior to crushing (not represented) as a result of a suction ventilator 81.

The sheath 82 joins the furnace flue 40 to feed a sheath 84. The air lead by the sheath 82 increases the temperature of the first and second gas lead by the furnace flue 40 above the dew point. The sheath 82 is equipped with a valve 83.

The sheath 84 leads the first and second gases and the hot air coming from the cooler towards a filter 86, for example a bag filter. The filter 86 dedusts and releases the first and second gas and the hot air from the cooler into the atmosphere through a chimney 88, as a result of a suction ventilator 41.

The sheath 84 is connected to a sheath 90 for supplying fresh air. This sheath 90 is equipped with a valve 92 liable to be open when the temperature upon suction of the filter 86 exceeds a maximum value specified by the provider.

The means 32 for generating the first gas are now described. The generation means 32 comprise a generator 94 of a gas at very high temperature and the mixing pot 79. The generator 94 comprises a furnace 96, a ventilator 98, and a combustible source 100. The generator 94 is for example a pulverized coal generator. The gas at very high temperature produced by the generator 94 is supplied to the pot by a furnace flue 102. The furnace flue 102 is equipped with a valve 104.

The pot 79 forms the first gas by mixing the hot air coming from the cooler supplied by the sheath 79 and the hot gas supplied by the furnace flue 102. The pot 79 is connected to the decarbonatation section 16 by the furnace flues 34.

The pot 79 is equipped with burners 106, for example gas burners. The burners 106 allow ensuring assistance during startup phases, and regulating the temperature of the first gas formed in the pot 79.

The generation means 36 of the second gas are now described. The generation means 36 comprise a furnace 108, such as a burner, a ventilator 110, and a combustible source 112, such as natural gas, configured for generating the second oxidizing gas.

The circulation of the cooling air and the first and second gases in the installation 62 is ensured by the suction ventilator 41 disposed downstream of the filter 86 and by the suction ventilator 81.

Particularly, the ventilator 41 generates a pressure gradient inside the enclosure 4, in such a manner that the highest pressure point of the enclosure 4 is the collection section 20, substantially at atmospheric pressure, and the least high pressure point of the enclosure 4 is the feeder section 14. Thus, the first and second gases ascend in the enclosure 4 in counter current of the pellets of raw mix, and then are suctioned by the furnace flue 40.

The ventilator 41 and 81 are sized in such a manner as to overcome the head losses resulting from the presence of the pellets of raw mix in the enclosure 4, of the presence of the filter 86, of the presence of the furnace flues 34, 40 and 102, the sheaths 76, 78, 80, 82, 84, and 90, of the presence of the pot 79 and of the presence of the valves 77, 83 and 104. In proportion to their closing degree, these valves 77, 83 and 104 cause a more or less important head loss. Thus, the valves 77, 83, and 104 allow equilibrating the head losses in the installation.

Figure 6:
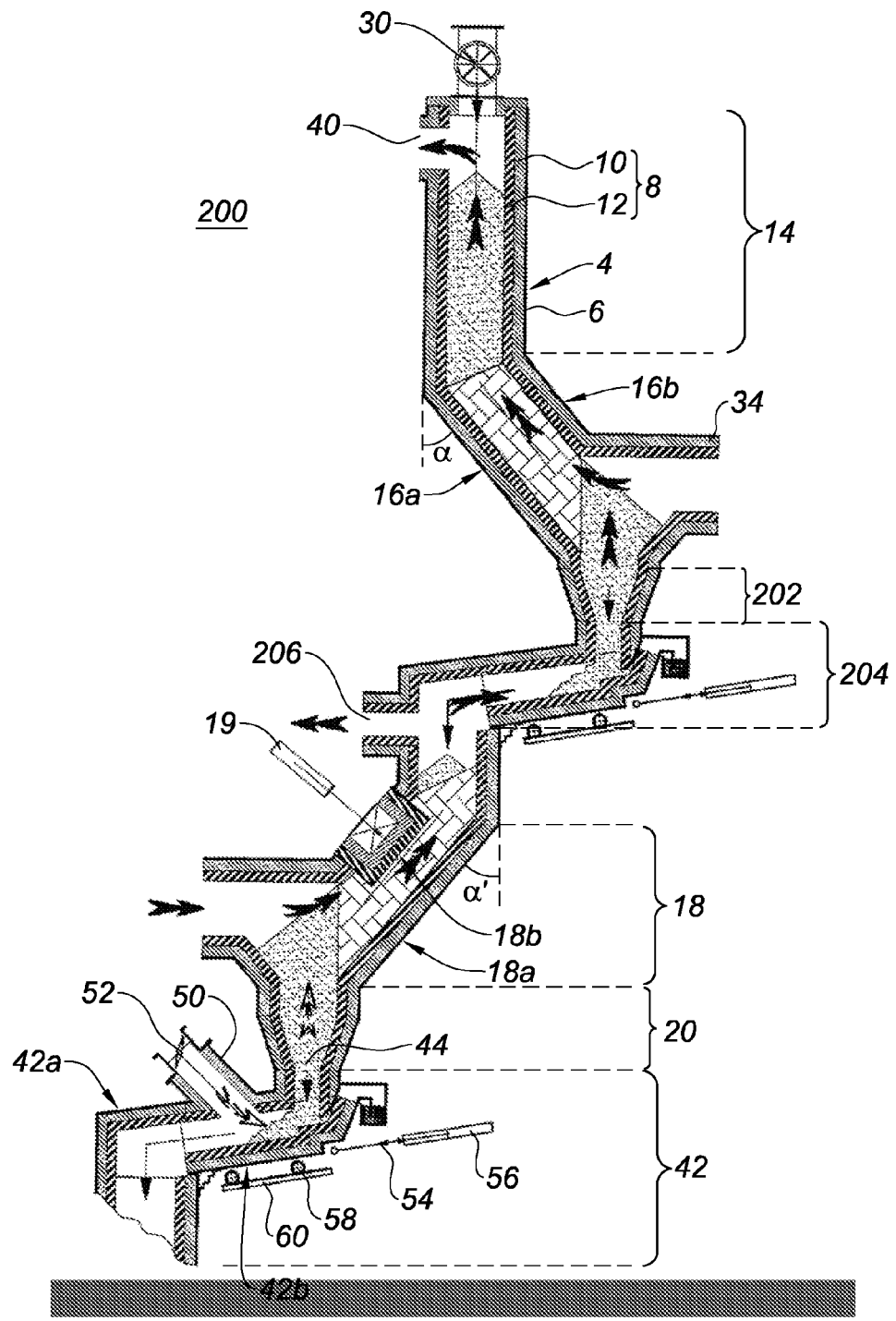
FIG. 6 is a longitudinal sectional view of a second vertical-shaft kiln.

FIG. 6 represents a second vertical-shaft kiln 200, which constitutes an alternative embodiment of the kiln 2 and in which the same elements are designated by the same references as on FIG. 1. The kiln 200 comprises an additional collection section 202 disposed between the decarbonatation section 16 and the clinkering section. This additional collection section extends substantially vertically.

The kiln 200 comprises extraction means arranged to extract the raw mix contained in the collection section 16 and supply it in the clinkering duct 18. These extraction means are suited for modulating the extraction output of the raw mix.

The extraction means are achieved in the form of a drawer extractor 204 identical to the drawer extractor 42, except that the stationary part does not have the ambient air supply pipe 50 and the valve 52.

The kiln 200 finally comprises suction means arranged between the decarbonatation section 16 and the clinkering section 18 to suction all or part of the second gas from the clinkering section 18. These suction means comprise a furnace flue 206.

Figure 7:
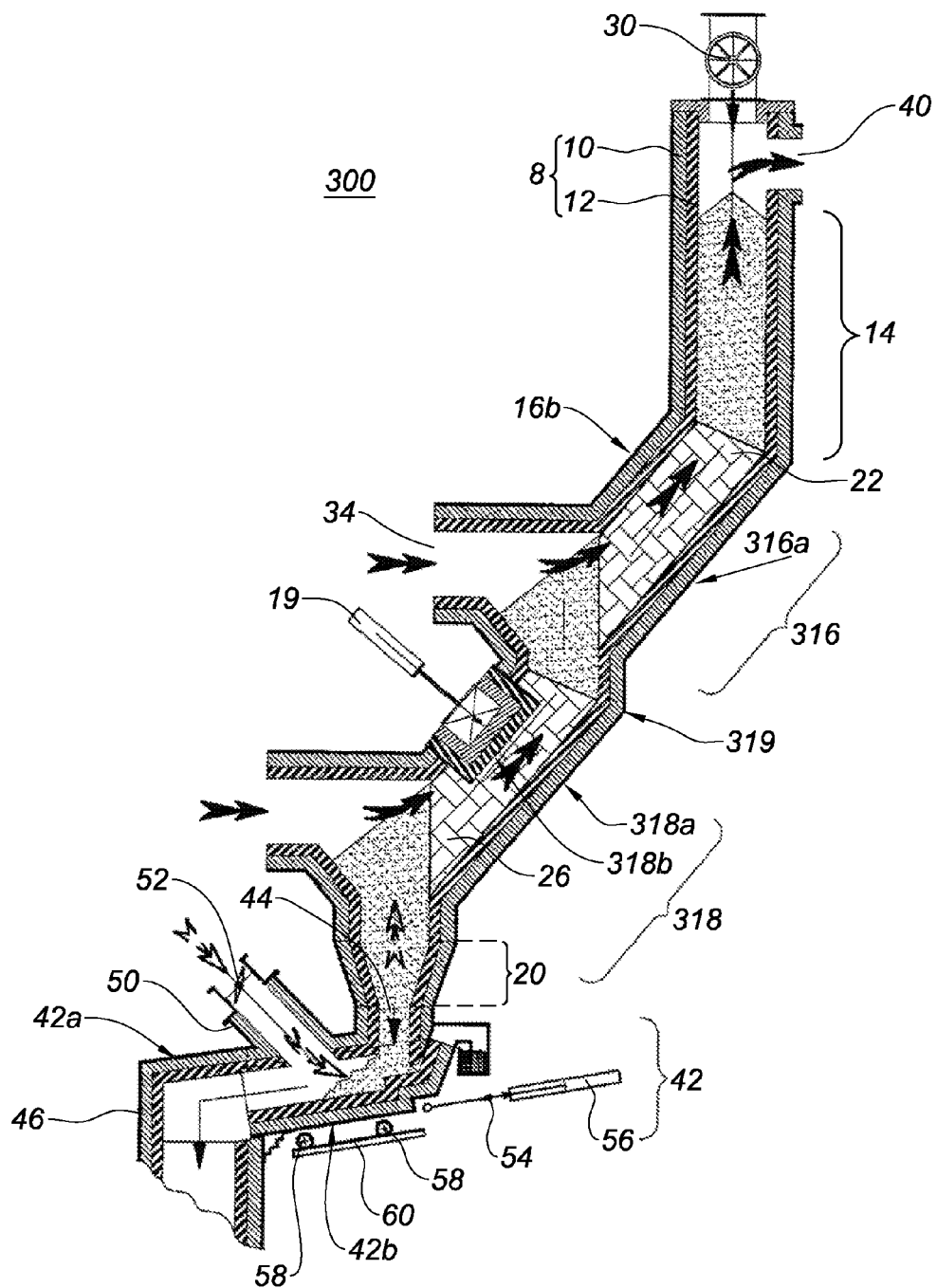
FIG. 7 is a longitudinal sectional view of a third vertical-shaft kiln.

FIG. 7 represents a third vertical-shaft kiln 300, which constitutes an alternative embodiment of the kiln 2 of FIG. 1 and in which the same elements are designated by the same references as on FIG. 1. This kiln 300 is distinguished from the kiln 2, in that the two respectively the decarbonatation 316 and clinkering 318 sections are slanted in the same direction. The lower surfaces 316*a* and 318*a* have the same inclination, shifted with respect to each other, and a downward setback 319 is provided between the lower end of the lower surface 316*a* of the decarbonatation section and the upper end of the lower surface 318*a* of the clinkering section. The upper surface 318*b* is moveable with respect to the lower surface 318*a*.

Figure 8:
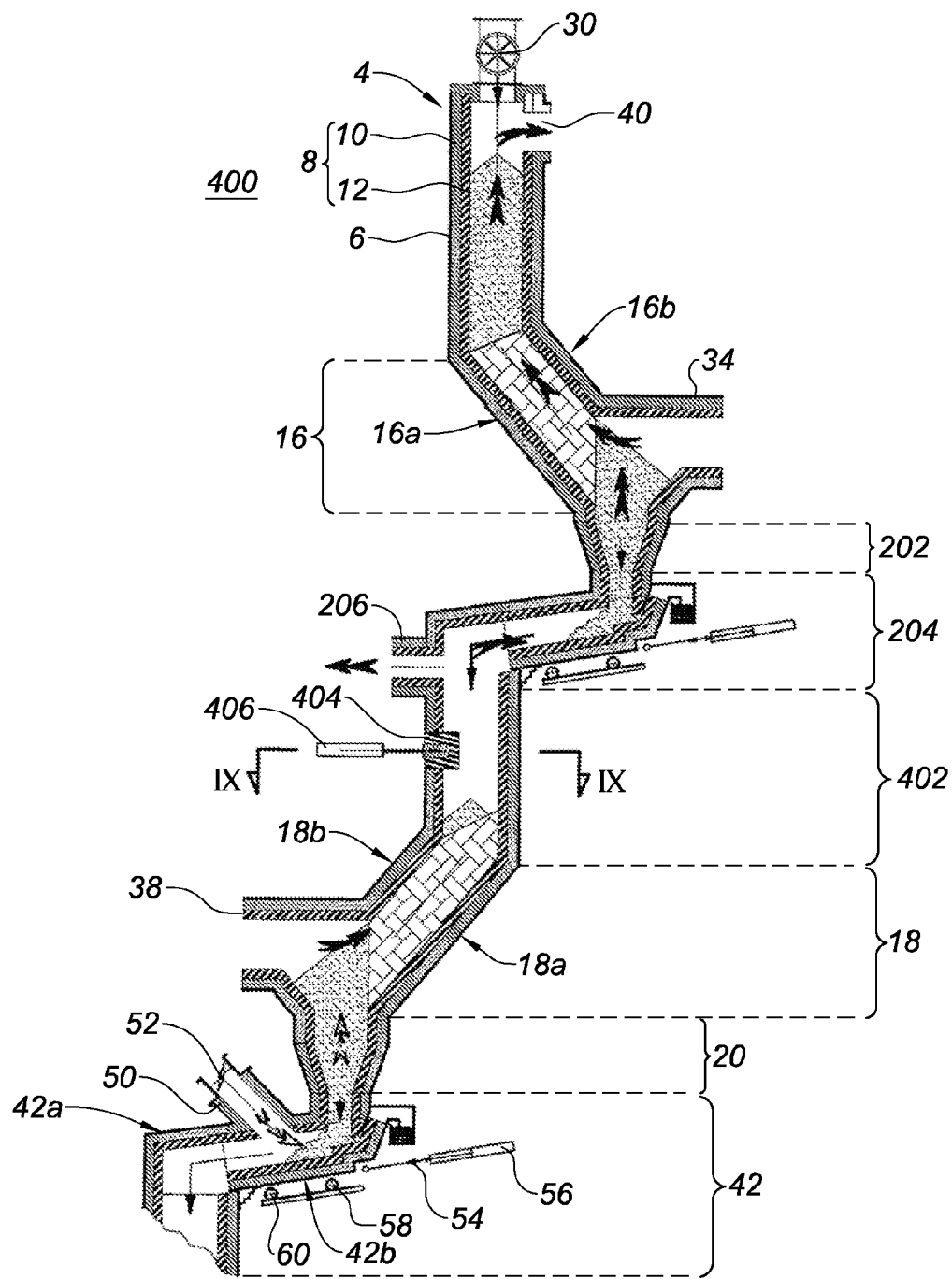
FIG. 8 is a longitudinal sectional view of a fourth vertical-shaft kiln.
Figures 9A, 9B:
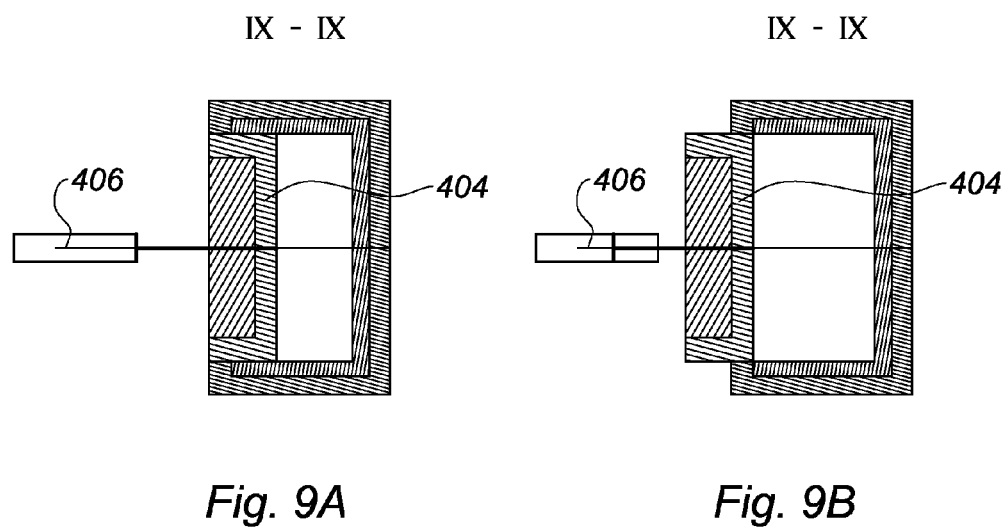
FIG. 9A is a cross-sectional view according to line IX-IX of FIG. 8, when a valve for regulating head loss of the second gas is in advanced position.
FIG. 9B is a cross-sectional view according to line IX-IX of FIG. 8, when the valve for regulating the head loss of the second gas is in receded position.

FIG. 8 represents a fourth kiln 400, which constitutes an alternative embodiment of the kiln 200 of FIG. 6, and in which the same elements are designated by the same references as on FIG. 6.

The kiln 400 comprises a connecting section 402 connecting the drawer extractor 204 to the clinkering section 18.

The device for adjusting the position of the lower and upper surfaces 18*a* and 18*b* of the clinkering section 18 by jacks is replaced with the acceptance of a variation in height of the layer in the clinkering section. The variation of the head loss of the gas crossing this layer, resulting from the variation in height of the layer, is compensated by the displacement of a valve 404 equipping the connecting section 402. The valve 404 is controlled by a jack 406.

As it is known per se, the invention is not limited to the sole embodiments of the kiln described above by way of examples, but on the contrary encompasses all the alternative embodiments.

The lock 30 may be replaced by a valve lock.

The outer metallic envelope 6 may be replaced by an outer reinforced concrete envelope.

The drawer extractor 42 may be replaced by a helmet-type extractor.

The jack 56 may be replaced by a hydraulic jack or a connecting rod mechanism associated with a motor.

The roller press 64 may be replaced by a disk pelletizer.

The bucket elevator 66 may be replaced by a conveyor belt, a chain conveyor, or a vibrating conveyor.

The conveyor 72 may be replaced by an apron conveyor, or any other type of conveyor allowing to ensure the transport of a clinker at a temperature in the range of 150° C. to 250° C.

The silo 74 may be replaced by a storage warehouse.

The first and second gas and the cooling air from the filter 86 may be used in a cogeneration system rather than be released into the atmosphere by the chimney 88.

The filter 86 may be replaced by an electrostatic filter.

The generator 94 may be replaced by an oil coke generator, or by any other solid or liquid combustible having a low cost and allowing to generate the first gas, a raw coal stoker, a coal pyrolyser, biomass pyrolyser, waste pyrolyser or similar.

The burners 106 may be fuel oil burners.

The generation means 36 may comprise a gas burner other than a natural gas one, with fuel oil, gas oil or a pulverized coal, or a petroleum coke generator, or any other solid or liquid combustible having a low cost and allowing to generate the second gas.

The invention claimed is:

1. A vertical-shaft kiln for manufacturing a clinker, comprising:
    a tubular enclosure comprising from top to bottom:
    a feeder section extending substantially vertically, configured for receiving a raw mix;
    a decarbonation section exhibiting a lower surface slanted with respect to the vertical;
    a clinkering section exhibiting a lower surface slanted with respect to the vertical;
    a first collection section extending substantially vertically;
    first extraction means configured for extracting the clinker from the first collection section, suitable for modulating an extraction output of the clinker;
    first generation means configured for generating a first gas exhibiting a temperature ranging between 950° C. and 1250° C.;
    first supply means configured to supply the first gas in the decarbonation section;
    second generation means configured for generating a second oxidizing gas exhibiting a temperature ranging between 1250° C. and 1450° C.;
    second supply means configured to supply the second oxidizing gas in the clinkering section; and
    first suction means configured for suctioning the first and second gas from the feeder section;
    wherein the decarbonation section and the clinkering section exhibit rectangular transversal sections;
    the decarbonation section and the clinkering section exhibit upper surfaces slanted with respect to the vertical;
    a lower edge of the lower surface of the decarbonation section extends substantially vertically in line with a lower edge of the upper surface of this decarbonation section; and
    a lower edge of the lower surface of the clinkering section extends substantially vertically in line with a lower edge of the upper surface of this clinkering section.

2. The kiln according to claim 1, wherein the lower surface of the clinkering section is oriented transversally to the lower surface of a carbonation section.

3. The kiln according to claim 1, wherein lower faces of the decarbonation and clinkering sections are slanted in a same direction.

4. The kiln according to claim 3, wherein the lower faces of the decarbonation and clinkering sections have a same inclination.

5. The kiln according to claim 3, wherein a downward setback is provided between a lower end of the lower surface of the decarbonation section and an upper end of the lower surface of the clinkering section.

6. The kiln according to claim 1, wherein the first supply means are configured to supply the first gas in the decarbonation section, from a downstream end of the decarbonation section; and
    the second supply means are configured to supply the second gas in the clinkering section, from a downstream end of the clinkering section.

7. The kiln according to claim 1, wherein the decarbonation section exhibits a plurality of longitudinal walls dividing the decarbonation section into a plurality of ducts; and/or
    the clinkering section exhibits a plurality of longitudinal walls dividing the clinkering section into a plurality of ducts.

8. The kiln according to claim 7, wherein the first supply means comprise a plurality of first furnace flues each opening at a downstream end of a duct of the decarbonation section; and
    the second supply means comprise a plurality of second furnace flues each opening at a downstream end of a duct of the clinkering section.

9. The kiln according to claim 1, further including:
    a second collection section disposed between the decarbonation section and the clinkering section;
    second extraction means configured for extracting the decarbonated raw mix contained in the second collection section and supplying the decarbonated raw mix to the clinkering section, the second extraction means being suitable for modulating an extraction output of the decarbonated raw mix.

10. The kiln according to claim 1, wherein the first and/or second extraction means comprise:
    an upper stationary part and a lower moveable part delimiting a connecting section, this connecting section being provided with an inlet mouth and an outlet mouth shifted vertically and horizontally;
    the lower moveable part being able to be displaced in a determined direction alternatively between an advanced position and a receded position, to allow a flow, respectively, of the clinker and the decarbonated raw mix in the connecting section; and
    means for displacing and guiding the lower moveable part relatively to the upper stationary part.

11. The kiln according to claim 10, wherein the upper stationary part of the first extraction means exhibits an ambient air supply pipe equipped with means for regulating the supplied ambient air output.

12. The kiln according to claim 1, further including second suction means between the decarbonation section and the clinkering section to suction all or part of the second gas from the clinkering section.

13. The kiln according to claim 1, further including means for adjusting the position of the slanted upper surface of the clinkering section with respect to the slanted lower surface of the clinkering section, in such a manner as to make a residence time of the clinker in the clinkering section vary.

14. An installation for manufacturing a clinker, further including:
    a kiln according to claim 1; and
    a cooler configured to cool the clinker extracted by the first extraction means.

15. A method for manufacturing a clinker, comprising the following steps:

providing a kiln according to claim 1;

supplying a first gas exhibiting a temperature ranging between 950° C. and 1250° C. in the decarbonation section; and supplying a second oxidizing gas exhibiting a temperature ranging between 1250° C. and 1450° C. in the clinkering section.

16. A vertical-shaft kiln for manufacturing a clinker, comprising:

a tubular enclosure comprising from top to bottom:

a feeder section extending substantially vertically, configured for receiving a raw mix;

a decarbonation section exhibiting a lower surface slanted with respect to the vertical;

a clinkering section exhibiting a lower surface slanted with respect to the vertical;

a first collection section extending substantially vertically;

first extraction means configured for extracting the clinker from the first collection section, suitable for modulating an extraction output of the clinker;

first generation means configured for generating a first gas exhibiting a temperature ranging between 950° C. and 1250° C.;

first supply means configured to supply the first gas in the decarbonation section;

second generation means configured for generating a second oxidizing gas exhibiting a temperature ranging between 1250° C. and 1450° C.;

second supply means configured to supply the second oxidizing gas in the clinkering section;

first suction means configured for suctioning the first and second gas from the feeder section; and a second collection section disposed between the decarbonation section and the clinkering section;

second extraction means configured for extracting the decarbonated raw mix contained in the second collection section and supplying the decarbonated raw mix to the clinkering section, the second extraction means being suitable for modulating an extraction output of the decarbonated raw mix.

\* \* \* \* \*